(No Model.) 11 Sheets—Sheet 2.
T. Z. COLE.
DREDGING MACHINE.

No. 277,236. Patented May 8, 1883.

(No Model.) 11 Sheets—Sheet 3.

T. Z. COLE.
DREDGING MACHINE.

No. 277,236. Patented May 8, 1883.

(No Model.) 11 Sheets—Sheet 4.

T. Z. COLE.
DREDGING MACHINE.

No. 277,236. Patented May 8, 1883.

Attest:
N. A. Clark
Louis F. Gardner

Inventor
T. Z. Cole,
per
F. A. Lehmann,
Atty (No Model.) 11 Sheets—Sheet 5.
T. Z. COLE.
DREDGING MACHINE.
No. 277,236. Patented May 8, 1883.
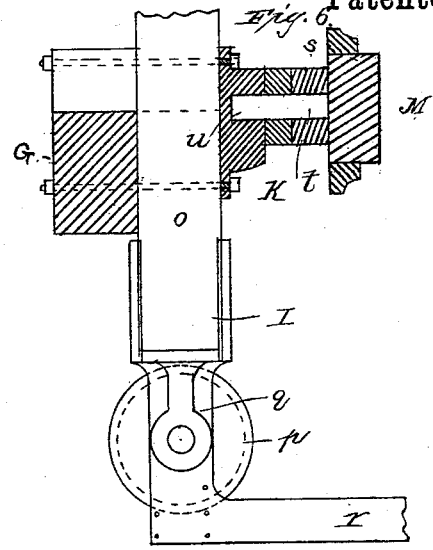
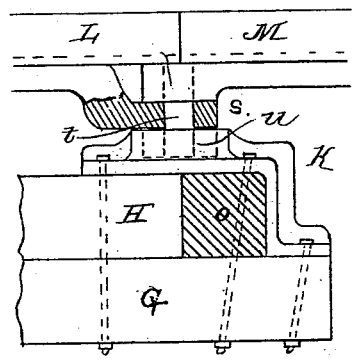
Attest:
J. E. Clark.
Louis F. Gardner.
Inventor
T. Z. Cole
per
F. A. Lehmann
Att'y.

(No Model.) 11 Sheets—Sheet 6.

T. Z. COLE.
DREDGING MACHINE.

No. 277,236. Patented May 8, 1883.

Attest:
N. A. Clark
Louis F. Gardner

Inventor
T. Z. Cole
per
F. A. Lehmann
Att'y.

(No Model.) 11 Sheets—Sheet 7.

T. Z. COLE.
DREDGING MACHINE.

No. 277,236. Patented May 8, 1883.

(No Model.) 11 Sheets—Sheet 8.
T. Z. COLE.
DREDGING MACHINE.
No. 277,236. Patented May 8, 1883.
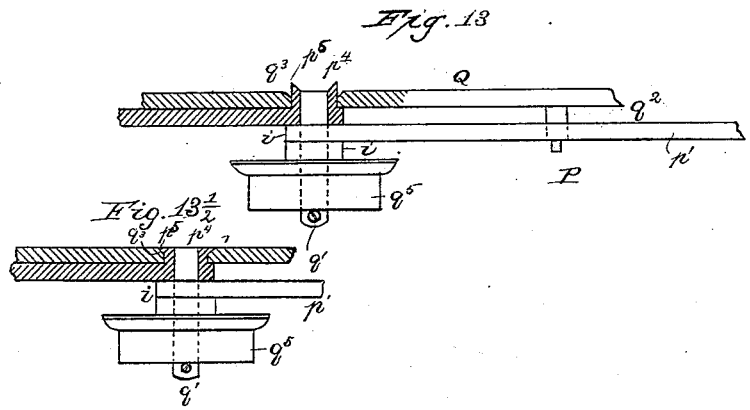
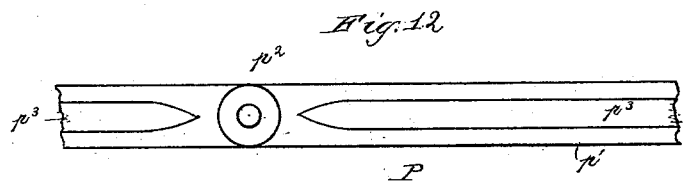
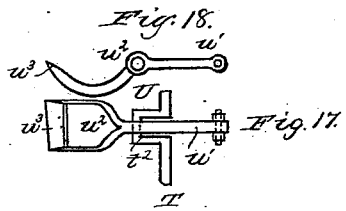
Attest:
N. A. Clark.
Louis F. Gardner
Inventor:
T. Z. Cole
per
F. A. Lehmann
Atty.

(No Model.) 11 Sheets—Sheet 9.

T. Z. COLE.
DREDGING MACHINE.

No. 277,236. Patented May 8, 1883.

(No Model.) 11 Sheets—Sheet 10.
T. Z. COLE.
DREDGING MACHINE.
No. 277,236. Patented May 8, 1883.
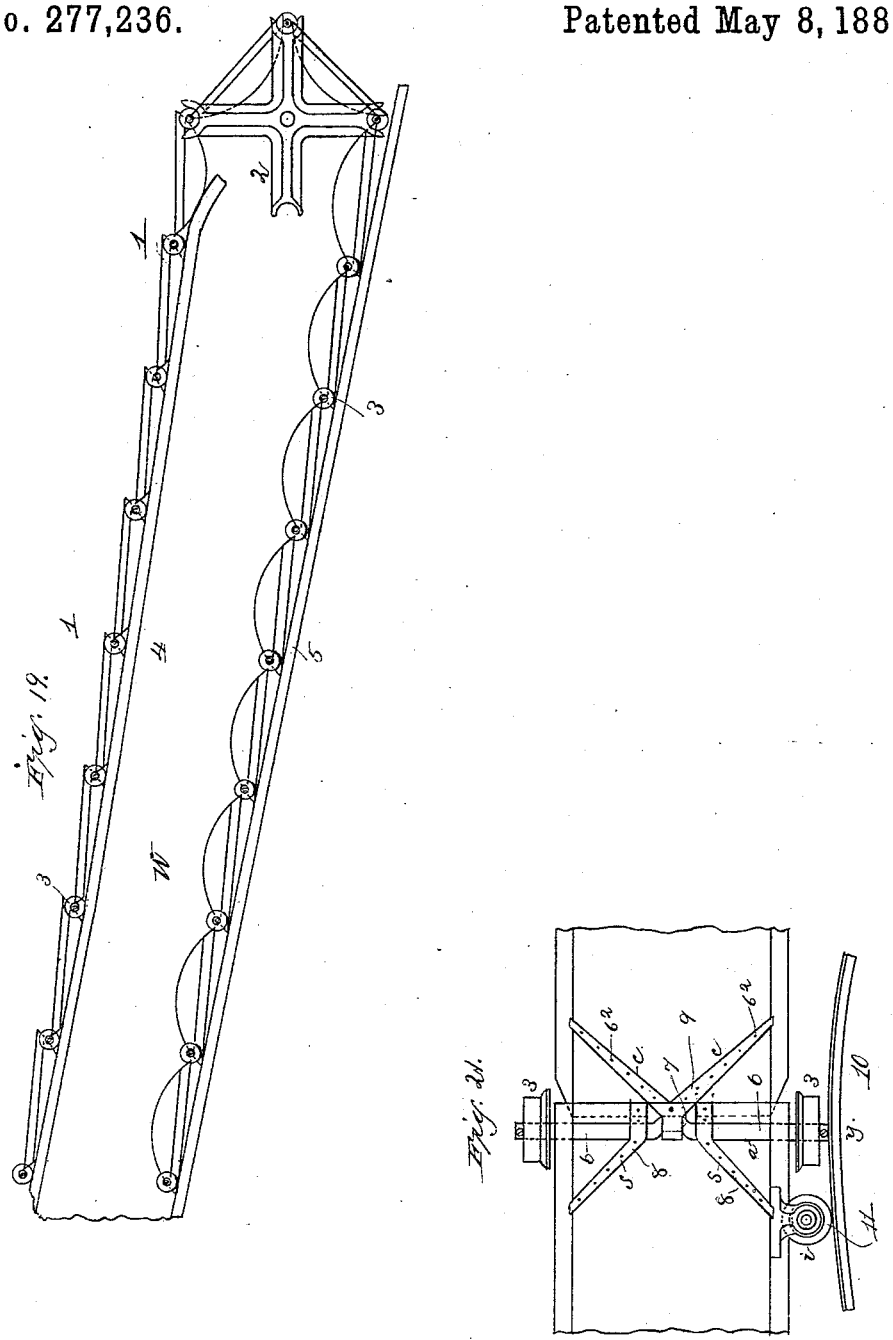

(No Model.) 11 Sheets—Sheet 11.
T. Z. COLE.
DREDGING MACHINE.
No. 277,236. Patented May 8, 1883.
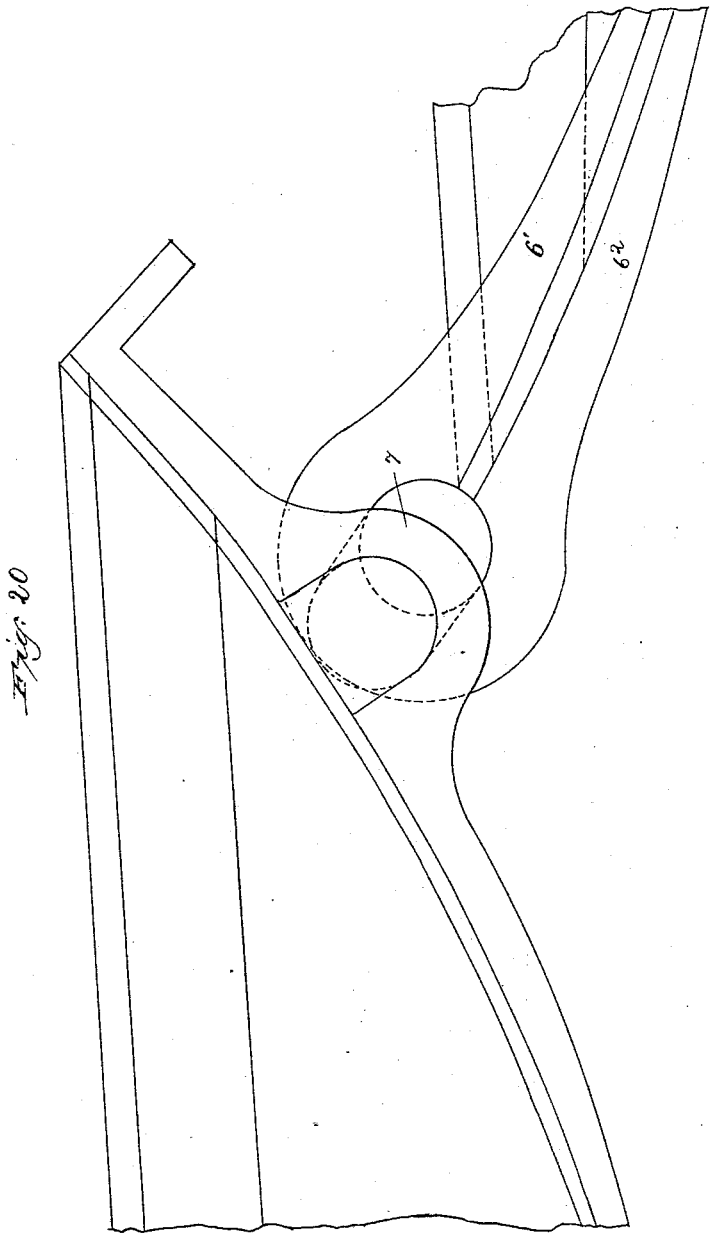
Attest;
N. A. Clark
Louis F. Gardner
Inventor;
T. Z. Cole,
per
F. A. Lehmann
Att'y.

UNITED STATES PATENT OFFICE.

THOMAS Z. COLE, OF KANSAS CITY, MISSOURI, ASSIGNOR OF ONE-HALF TO LOREN G. JEFFERS AND L. G. JEFFERS, JR., OF SAME PLACE.

DREDGING-MACHINE.

SPECIFICATION forming part of Letters Patent No. 277,236, dated May 8, 1883.

Application filed November 4, 1882. (No model.)

*To all whom it may concern:*

Be it known that I, T. Z. COLE, of Kansas City, in the county of Jackson and State of Missouri, have invented certain new and useful Improvements in Dredging-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in dredging-machines; and it consists in the peculiar construction and combination of parts, to be more fully set forth hereinafter, whereby an efficient dredging-machine is produced.

Figure 1:
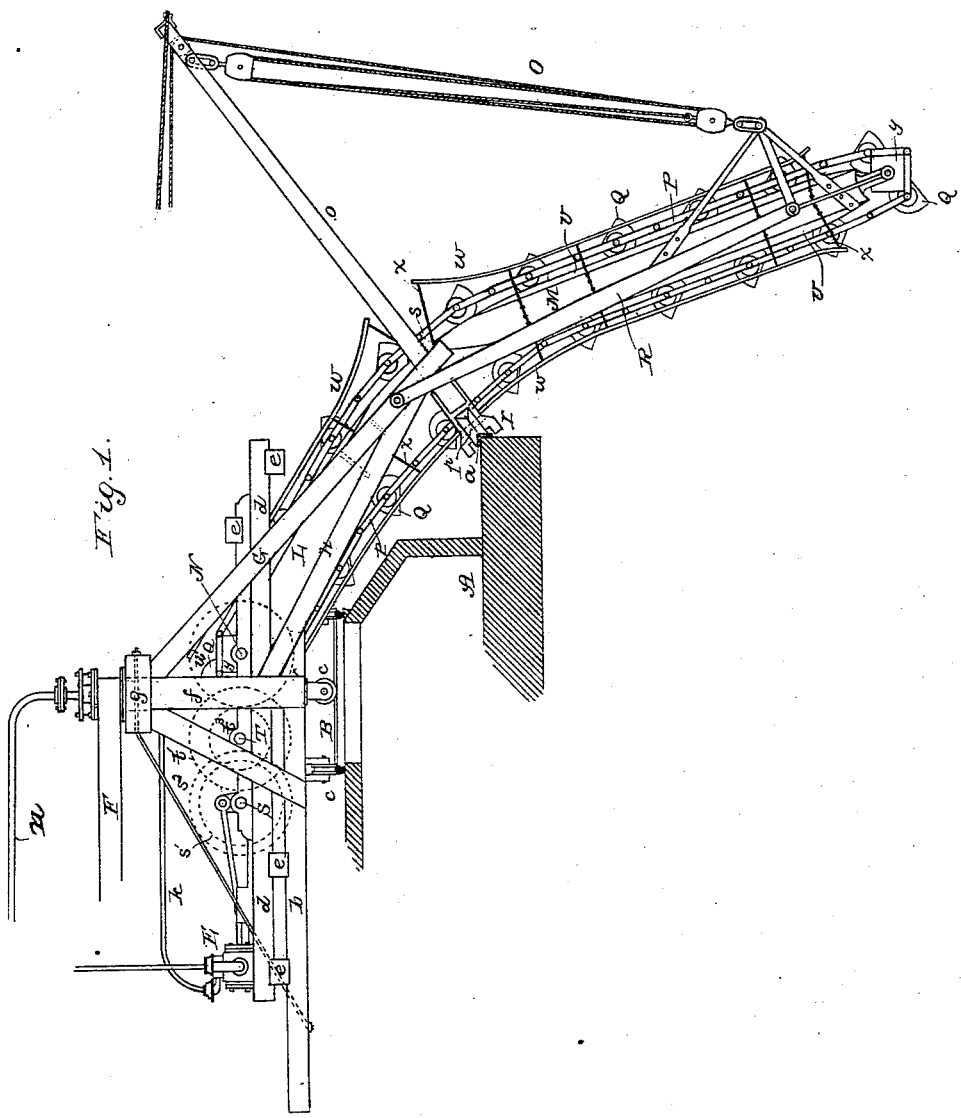
Figure 2:
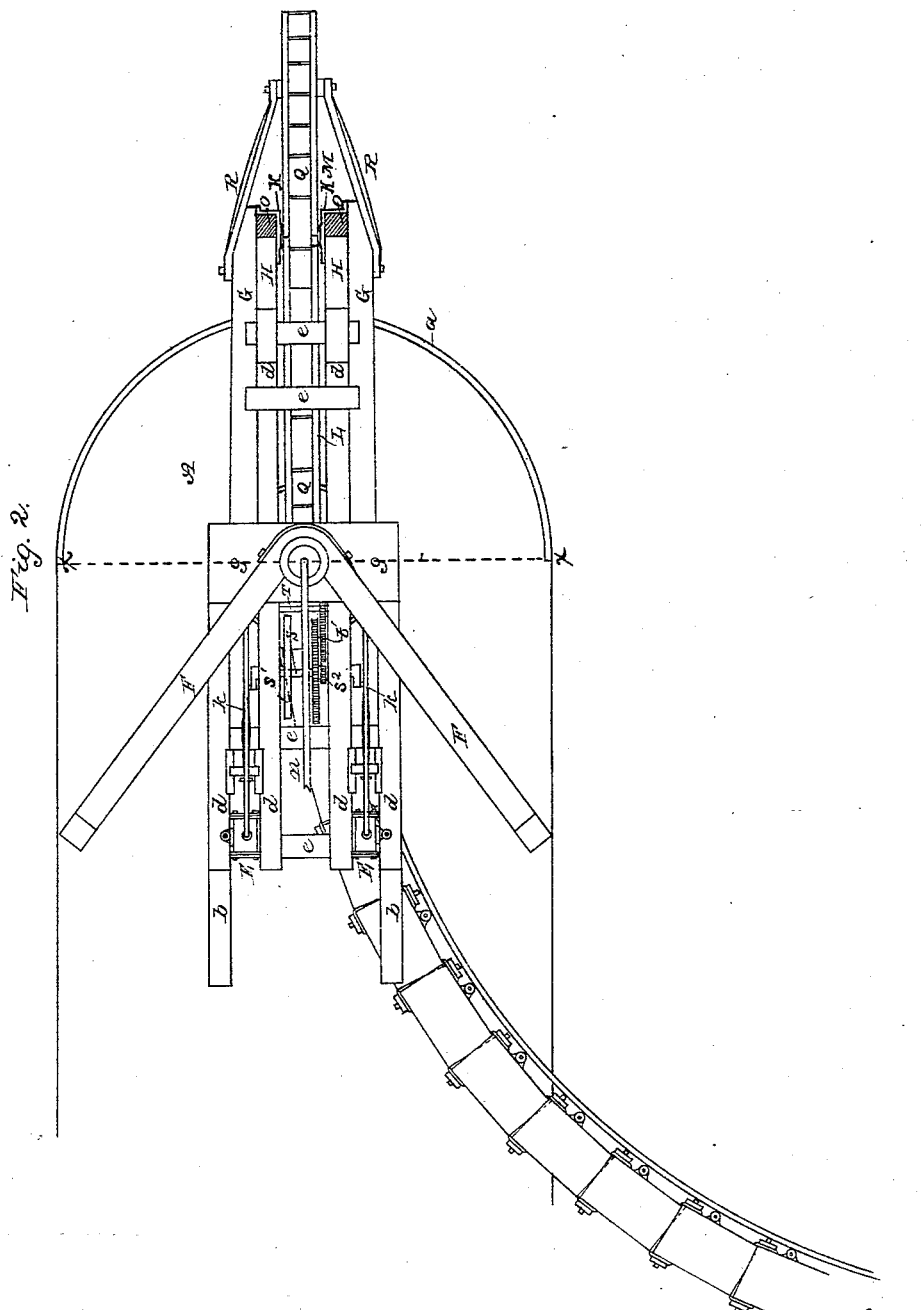
Figure 3:
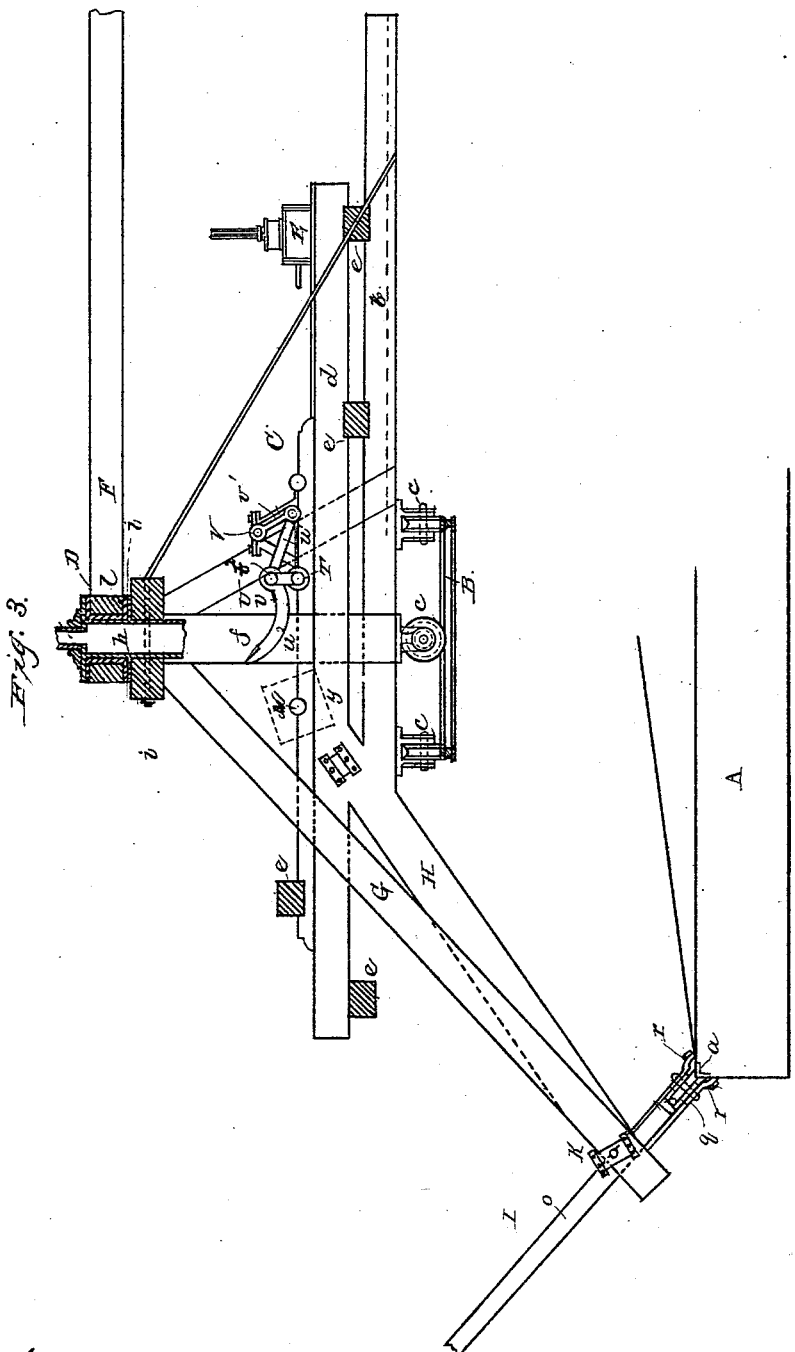
Figure 4:
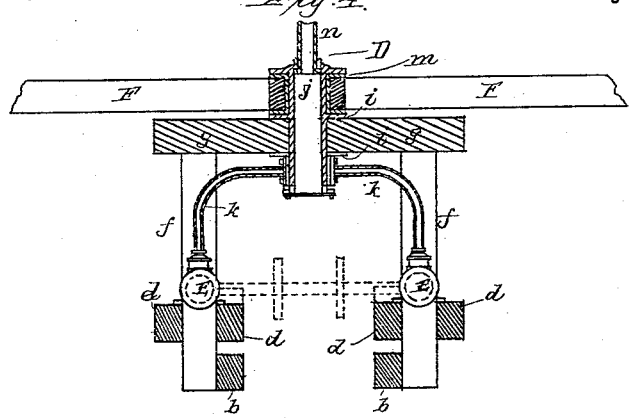
Figure 5:
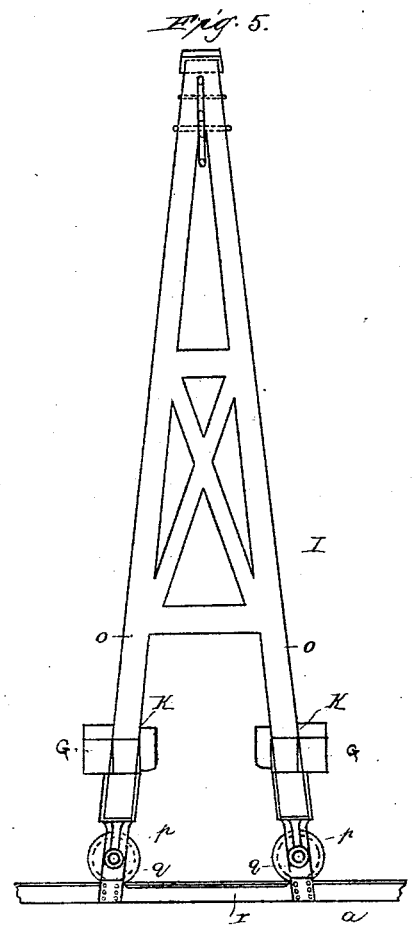
Figure 8:
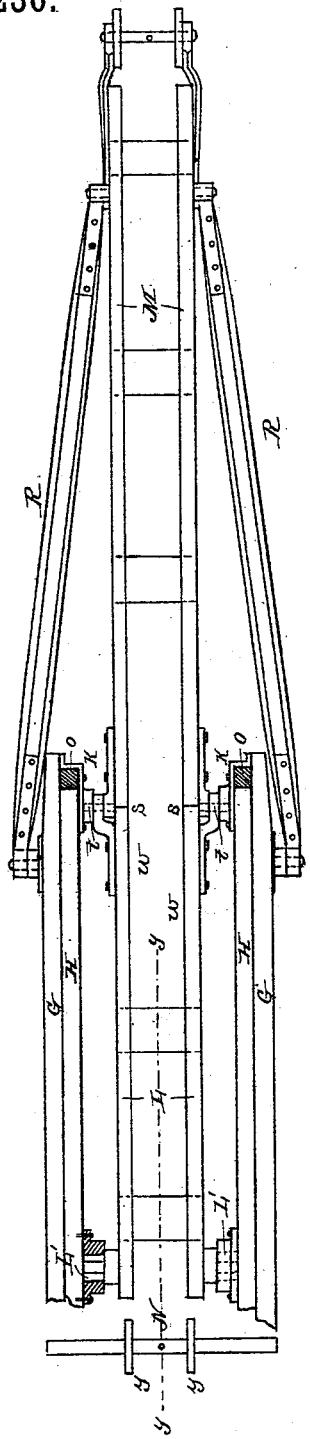
Figure 9:
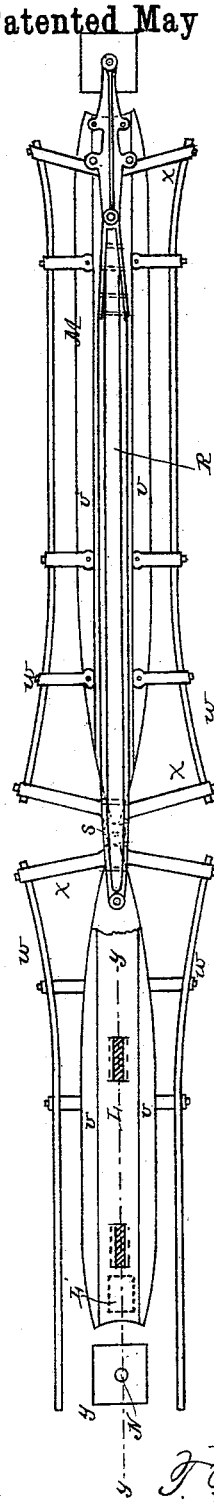
Figure 10:
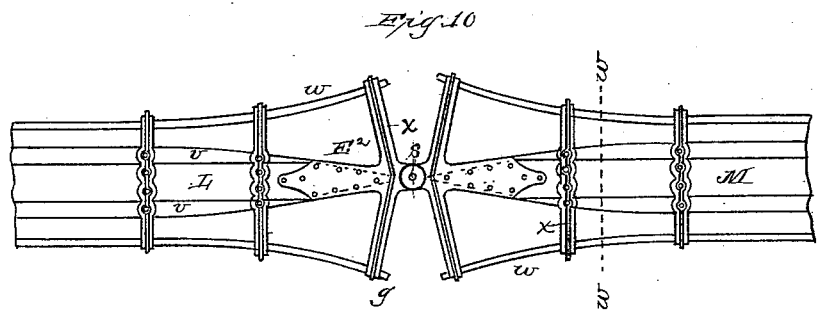
Figure 11:
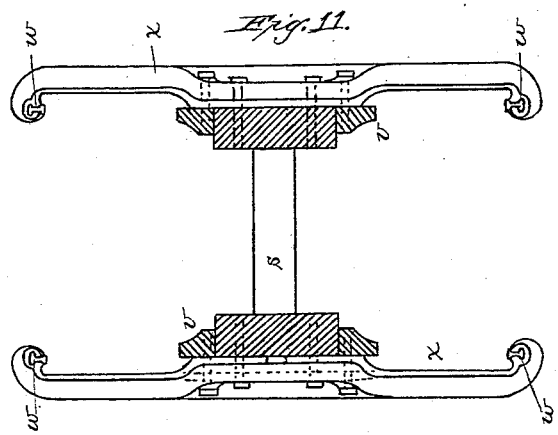
Figure 16:
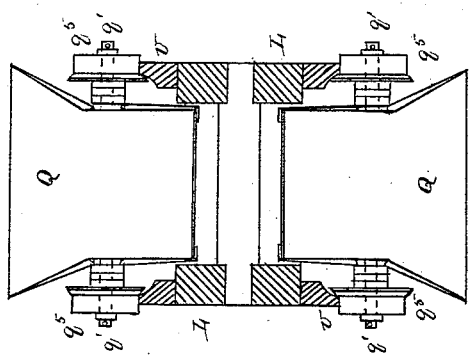
Figure 15:
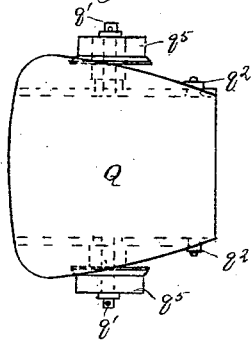
Figure 14:
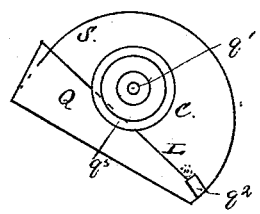

In the accompanying drawings, Figure 1 is a side elevation, partly in section. Fig. 2 is a top plan view. Fig. 3 is a detail view of the pivoted mechanism. Fig. 4 is a cross-section on the line $x\ x$, Fig. 2, showing the construction of the derrick-pivot. Fig. 5 is a detailed front elevation of the derrick. Fig. 6 is a detailed view of a portion of the same, showing the construction of the pivot-connection of the derrick and bucket-carrier frame. Fig. 7 represents the same in top plan. Fig. 8 is a detailed top plan view of the bucket-frame. Fig. 9 is partly a longitudinal elevation and partly a section on the line $y\ y$, Fig. 8. Fig. 10 is a side elevation of the pivot-joint. Fig. 11 is a cross-section on the line $w\ w$, Fig. 10. Fig. 12 is a side elevation of a portion of the bucket-elevating chain. Fig. 13 is a top plan view of the same, partly in section, prior to completion of joint. Fig. 13½ represents the same completed. Fig. 14 is a side elevation of one of the buckets. Fig. 15 is a bottom plan of the same. Fig. 16 is a cross-section through the bucket-carrier frame, showing the buckets in position. Fig. 17 is a top plan view of the scraper. Fig. 18 is a side elevation of the same. Fig. 19 is a side elevation of the discharging-bucket carrier. Fig. 20 is a side elevation, illustrating the details of construction of bucket-joints. Fig. 21 is a bottom plan view of a portion of two of the buckets.

A represents a scow of any suitable construction, the bow of which is semicircular in shape, as shown at Fig. 2. At the center from which this arc is drawn upon the deck of the boat is placed the circular track B, of ordinary railroad steel rail, upon which is adapted to revolve, by means of wheels or rollers $c$, the turntable C, which is composed of the longitudinal beams $b\ d$ and the cross-connecting beams $e$. From the sides of the frame C, in a line intersecting the center of the circular track B, rise the stanchions $f$, which are connected by the top beam, $g$, as shown at Fig. 4. Through the center of this beam $g$ extends the pivoted steam-inlet tube D, which consists of the interior cylinder, $h$, securely fastened thereto at the bottom by means of the flanges $i$ and suitable bolts and nuts. From the bottom of this cylinder D extend the connecting-pipes $k$, for conveying steam to the cylinder of the engine E, securely mounted between and on top of the beams $d$ at the rear end of the turn-table. The upper portion of the cylinder D is swiveled, in a collar, $l$, having flanges $m$, by means of which and suitable bolts and nuts it is made fast to the cross-beams F, which extend diagonally from the sides of the boat, and converge to a point at the center of the turn-table, as shown at Fig. 2. These beams serve to securely brace the turn-table in position, and while they allow it to revolve by reason of the mechanism described effectually prevent its being overturned or tilted when the dredger is in operation.

Swiveled in the top of the cylinder D is the steam-pipe $n$, which conveys steam from the boiler (not shown) to the cylinder D.

Secured to the front side of the stanchions $f$, at their upper ends and inclining at an angle of forty-five degrees, (45°,) are the beams G, which extend out a short distance beyond the bow of the boat, and, in connection with the beams H, which extend from the beams $d$ and $b$ of the turn-table, serve to support the derrick I in a position at right angles to the beams G. This derrick is A-shaped in front elevation, the vertical beams $o$ of which are secured to the beams G and H by means of the casting K, (shown in top plan at Fig. 7, and in front end elevation at Fig. 6,) the casting K being secured to the derrick-legs and the beams G and H by means of suitable bolts and nuts, as shown at Figs. 6 and 7. The lower ends of the derrick-legs $o$ are provided with wheels $p$, secured thereto by means of the hangers $q$, which hangers are secured together and firmly braced by the connecting-bars $r$, as shown at Figs. 3, 5, and 6. The wheels $p$ are suitably grooved to enable them to keep to the track $a$, of angle-iron, with which the curved bow of the boat is provided. By this construction it will be seen that the turn-table, carrying the engines, the derrick, and all the dredging machinery, may be freely swung at will around the half-circle formed by the bow of the boat, and thus not only can the dredgers be applied to the bottom of the stream at any point desired without changing the position of the boat, but by reason of the engines being secured directly to the turn-table at its rear end, and partaking of its motion, their weight serves as a counterbalance to the machinery at the forward end of the turn-table, and thus, no matter in what position the dredgers may be shifted, the boat will remain level in the water. Moreover, by having the turn-table thus counterbalanced it is rendered much easier to rotate, and unequal side strain upon it is prevented, as will be readily understood.

L M represent the side bars of the bucket or dredging frame, the upper portion, L, being journaled in slotted blocks on the inside of the turn-table frame, the lower section, M, being pivoted to the upper section, L, at the point $s$, as shown at Figs. 7, 8, 9, and 10, the bucket-frame being there pivoted to the inside of the derrick by means of the casting K, fastened therein, and the pins $t$, which project through the joints of the bucket-frame and into the slots $u$, formed in the interior faces of the casting K, to receive them, as shown at Fig. 7. By means of this construction the upper section of the bucket-frame is secured at an angle of forty-five degrees, (45°,) and permitted to swing freely around to any point in the semicircle, while the lower section, partaking of the same movement, is enabled to be applied to the bottom of the stream at any desired angle by means of the tackle O. (Shown at Fig. 1.) At the joint $s$ the ends of the sections L M of the bucket-frame are rounded and brought to a point, as shown at Figs. 9 and 10, the upper and lower faces of the beams being sheathed in iron or steel, as at $v$, so as to form a bearing-surface or track for the wheels of the buckets to run upon.

Supported at a suitable distance above and below the beams L M are the tracks or guards $w$, which are supported by the brackets $x$, secured to the outside of the frames. At the joint of the frames these tracks are curved out in opposite directions, so that the upper rail will conform in curve to the lower face of the beam, and the lower rail will conform in curve to the upper face of the beam, respectively, as shown at Fig. 10, thereby presenting to the wheels of the buckets an unbroken track on the upper side of the bar L M for the ascending buckets, and an unbroken guard-rail, $w$, on the under side thereof for the descending buckets, no matter at what angle the lower half-section of the bucket-frame may be placed, as illustrated at Fig. 1.

Rigidly secured to the shaft N at the upper end of the bucket-frame are the square pulleys $y$, which are placed upon the shaft at a suitable distance inside of the tracks upon the frames, two similar square pulleys being also journaled to the outer end of the lower section of the frame. Over these pulleys pass the endless chains P, to which are attached the dredging-buckets Q, the chains being constructed of links $p'$, of suitable material, having the pivoted joints $p^2$ and the open slots $p^3$, as shown at Figs. 12 and 13. From the sides of the buckets, near the center, protrude the pins or pivots $q'$, which extend through the links $p'$ at the joints, and thus secure the buckets to the chain.

In order to prevent the buckets from oscillating, I provide them on the side near one end with lugs $q^2$, which extend into the open slots $p^3$ of the links, and thus hold them rigidly in the position shown in Fig. 1.

On the inner side of one end of each link I provide an annular projection, $p^5$, with beveled flange $p^4$. This projection extends through a circular opening made in the side of the bucket, the said bucket-opening being on its inner side provided with a beveled countersink, $q^3$. Through the annular projection extends the pin $q'$, which is put in cold, the projection being heated and the flange $p^4$ driven into the countersink $q^3$ and smoothed. (See Fig. 13½.) When the end of the link shrinks in cooling, the pin and bucket are very firmly secured. This manner of securing the pin is of great importance, as great strength is required to resist the strain upon the working parts when the machine is in motion.

Upon the outer ends of the pins $q'$ are mounted the wheels $q^5$, which run upon the track on the bucket-frame previously described. When the elevating-frame is straight, as shown at Fig. 9, the chain carrying the bucket will be taut; but when the elevating-frame is in the position shown in Fig. 1 the lower side of the chain will sag and render it difficult to operate. In order to overcome this tendency of the chain to sag, I provide the pitmen R, the upper ends of which are pivoted to the outside of the turn-table frame at a point somewhat back of the pivot-joint in the bucket-frame, the lower ends of the pitmen being pivoted to the lower end of the lower section of the bucket-frame. The upper section of the bucket-frame being pivoted in slotted blocks L' upon the inside of the turn-table frame by means of the pins $L^2$, as shown in Fig. 8, so that it can be freely moved in and out a short distance, and the pitmen being pivoted back of the center joint of the bucket-frame they will force the frame far enough out when lowered or hoisted to compensate for the sag of the chain, and thus keep the chain at the proper tension, no matter at what angle the lower section of the frame may be placed, as will be readily understood.

The engines E impart motion to the shaft S, mounted in suitable bearings, on which shaft is the fly-wheel $s'$ and the pinion $s^2$, which meshes in with the large spur-wheel $t'$ on the shaft T, (see Fig. 2,) which shaft has a crank formed in its center and carries a smaller spur-wheel, $t^3$, at the opposite end from the wheel $t'$. The wheel $t^3$ meshes in with a large spur-wheel, $u'$, on the shaft N, that carries the square pulleys. This gearing is so contrived that the shaft T will make four revolutions to every one of the shaft N, being one for every face of the square pulley.

U represents the scraper for taking the earth from the buckets, which is pivoted at the center in the crank $t^2$, has the straight rear end, $w'$, and the curved forward portion, $w^2$, shaped in side elevation as shown at Fig. 18, the curved end being bifurcated and provided with the scraper $u^3$, connecting the bifurcated end, as shown at Fig. 17. The rear end of the scraper U is pivoted to the lower end of an arm, $v'$, the upper end of which is connected to a rock-shaft, V, mounted in suitable bearings on the turn-table. (See Fig. 3.) By this arrangement as the shaft T revolves the forward end of the scraper U will be caused to describe a curve precisely similar to the shape of the buckets Q, and its movement being so timed as to cause it to engage with each of the buckets as they pass over the pulleys $y$, they will all be successively emptied of their contents, as will be readily understood.

W represents a carrier for conveying the earth discharged from the dredging-buckets out over one side of the boat; and it consists of an endless chain of cars, 1, stretched over pulleys 2, one of which is shown at Fig. 19. Each of the cars 1 is provided near its rear with the wheels 3, being adapted to run upon the tracks 4 and 5, the wheels being mounted upon the rod 6, which is bent out in the middle, so as to form a curved portion, 7, as shown at Fig. 21, this rod being secured to the bottom of the car by means of straps 8. The forward end of the adjacent car is attached to the rod 6 at the bent portion 7 by means of the strap 9, which is secured to the bottom of the rear car and curves over the bent portion 7 of the rod, as shown at Fig. 20, thereby pivoting the cars together. The strap 9 not only serves to pivot the cars, but, as it is bent over the rod 6, and then extends back over the bottom of the car, thereby clamping and bracing the bottom between the upper and lower portions, $6'$ $6^2$, it materially assists in rendering the car stiff and strong. By reason of the curved portion of the rod where the cars are pivoted together a sufficient lateral play is allowed the cars to enable them to follow the curved track 4 5, which extends out over the side of the boat.

In order to cause the car to keep the track, I provide an additional rail, 10, (see Figs. 20, 21,) which is placed a little above the main rails on the inside of the curve, and provide the inside bearing-wheels, 11, to the cars, these wheels being adapted to bear against the inner side of the rail 10, and thus cause the cars to keep to the track, as will be readily understood. Around the upper rim of each of the cars 1 is placed a strip of angle-iron, whose function is to stiffen and brace the cars sufficiently to enable them to resist the side pressure brought to bear against them.

A dredging-machine thus constructed will do its work thoroughly and with the least possible friction and wear of the parts. Its action will be steady and regular, and all unnecessary jar and rocking will be avoided.

Having thus described my invention, I claim—

1. The turn-table C, mounted upon the wheels $c$, adapted to revolve upon the circular track B upon the deck of the boat, the turn-table having the engine E upon one end, and having the dredging-bucket frame pivoted to the other end, and mechanism for operating the same, the turn-table being suitably braced and provided with the pivotal steam-inlet tube D of suitable construction, adapted not only to pivot the turn-table to the braces F, but also to admit the passage of the steam from boilers to the engines located upon the turn-table, substantially as described.

2. The derrick I, secured to suitable beams, which project from the front end of the turn-table at a suitable angle, the said derrick being provided with rollers at its lower end for adapting it to be rotated upon a suitable track formed upon the bow or stern of the boat, the derrick being further provided with suitable slotted castings, K, for securing it to the beams which project from the turn-table, and for the reception of the bucket-frame, whereby the turn-table, derrick, and dredging-bucket frame all partake of the same motion when revolved around the bow of the boat, substantially as set forth.

3. The bucket-frame consisting of the sections L M, the section L being pivoted in slotted blocks secured to the inside of the forward end of the turn-table frame, and the lower section, M, being pivoted to the upper section at $s$, the frames being rounded, so as to converge to a point at the joint, and adapted for the passage of the flanged wheels of the buckets Q over them, the upper and lower sections being pivoted at the joint in slotted castings secured in the derrick I, the said bucket-frames being provided with the square pulleys $y$ at their extremities, and with an endless chain carrying buckets of suitable construction revolving thereon, in combination with the pitmen R, pivoted to the turn-table frame at their upper ends a slight distance to the rear of the joint in the bucket-frame, whereby the chain carrying the buckets will be always kept taut, no matter at what angle the lower section may be placed, substantially as shown and described.

4. The bucket-frame consisting of the sections L M, the section L being pivoted in slotted blocks secured to the inside of the forward end of the turn-table frame, and the lower section, M, being pivoted to the upper section at $s$, the frames being rounded, so as to converge to a point at the joint, and adapted for the passage of the flanged wheels of the buckets Q over them, and being further provided with the guard-rails $w$, supported a suitable distance above and below the section-frames, the said guard-rails being bent out at a curve to correspond to the opposite rounded (at the joint) portions of the frames, the rails being adapted for guiding the buckets on their downward passage, the upper and lower sections being pivoted at the joint in slotted castings secured in the derrick I, the said bucket-frames being provided with the square pulleys $y$ at their extremities and with an endless chain carrying buckets of suitable construction revolving thereon, in combination with the pitmen R, pivoted to the turn-table frame at their upper ends a slight distance to the rear of the joint in the bucket-frames, and having their lower ends pivoted to the lower section of the bucket-frames, whereby the chain carrying the buckets will be always kept taut, no matter at what angle the lower section may be placed, substantially as shown and described.

5. The chain P, constructed of links $p'$ of suitable material, having pivoted joints $p^2$ and open slots $p^3$, in combination with the buckets Q, the buckets being secured to the links by means of lugs $q^2$, which extend into the slots $p^4$, and by means of the pivot-pins $q'$, which are secured in the sides of the buckets and extend out through the joint of the links, substantially as specified.

6. The combination of the buckets Q, the chains P, and the pivot-pins $q'$, the links of the chain being provided with annular projections or bosses $p^5$, provided with flanges $p^4$, and the buckets having suitable openings in their sides provided with countersinks or shoulders, substantially as described.

7. The scraper U, pivoted in the crank $t^2$ of the shaft T, and having the straight forward portion $u'$ and curved forward portion $u^2$, the forward end being bifurcated and provided with the scraping-knives $u^3$, the said scraper being operated by means of the crank-shaft T, and the rock-shaft V, and arm $v'$, actuated by suitable mechanism, whereby as the buckets are presented to the scraper they are cleared of their contents, substantially as set forth.

8. The buckets Q, curved in side elevation, so as to conform to the path traversed by the scraper U, and provided with the lugs $q^2$ and central openings for the reception of the annular projections of the chain-links, in combination with chains of suitable construction, substantially as specified.

9. The cars 1, forming an endless carrier operating upon the pulleys 2, of suitable construction, the cars being provided with wheels 3, adapted to run upon the tracks 4 5, and secured together by means of a pivotal joint formed of the curved rod 6 and the strap 9, secured, respectively, to the rear and front of the bottoms of adjacent cars, whereby the cars are allowed a slight lateral movement, the cars being further provided with the bearing rollers or wheels 11 for bearing against the inside bearing-rail, 10, in combination with the pulleys 2, and the curved tracks 4 5, and bearing-rail 10, all substantially as and for the purpose set forth.

In testimony whereof I affix my signature in presence of two witnesses.

THOMAS Z. COLE.

Witnesses:
 JOHN K. CRAVENS,
 R. O. BOGGESS.